(12) United States Patent
Kim et al.

(10) Patent No.: US 10,637,098 B2
(45) Date of Patent: Apr. 28, 2020

(54) POLYMER ELECTROLYTE FOR LITHIUM SECONDARY BATTERY AND LITHIUM SECONDARY BATTERY INCLUDING THE SAME

(71) Applicants: SAMSUNG SDI CO., LTD., Yongin-si, Gyeonggi-do (KR); IUCF-HYU (Industry-University Cooperation Foundation Hanyang University), Seoul (KR)

(72) Inventors: Duck Hyun Kim, Yongin-si (KR); Hee Eun Yoo, Yongin-si (KR); Tae Ri Kwon, Yongin-si (KR); Tae Hyun Bae, Yongin-si (KR); Si Young Cha, Yongin-si (KR); Min Ju Lee, Yongin-si (KR); Il Kyoung Kwon, Yongin-si (KR); Woo Cheol Shin, Yongin-si (KR); Dong Won Kim, Seoul (KR); Yun Chae Jung, Seoul (KR)

(73) Assignees: Samsung SDI Co., Ltd., Yongin-Si, Gyeonggi-do (KR); Industry-University Cooperation Foundation Hanyang University, Seongdong-gu, Seoul (KR)

( * ) Notice: Subject to any disclaimer, the term of this patent is extended or adjusted under 35 U.S.C. 154(b) by 288 days.

(21) Appl. No.: 15/416,614

(22) Filed: Jan. 26, 2017

(65) Prior Publication Data
US 2017/0222262 A1    Aug. 3, 2017

(30) Foreign Application Priority Data

Jan. 29, 2016    (KR) .................. 10-2016-0011830

(51) Int. Cl.
*H01M 10/0565*    (2010.01)
*H01M 2/16*    (2006.01)
(Continued)

(52) U.S. Cl.
CPC ....... *H01M 10/0565* (2013.01); *H01M 2/166* (2013.01); *H01M 10/052* (2013.01);
(Continued)

(58) Field of Classification Search
None
See application file for complete search history.

(56) References Cited

U.S. PATENT DOCUMENTS 4,686,044 A     8/1987  Behnke et al.
6,296,783 B1 *  10/2001 Shindo ................. H01B 1/122
                                                      252/500
(Continued)

FOREIGN PATENT DOCUMENTS

JP    2000-067643 A    3/2000
JP    2002-025335 A    1/2002
(Continued)

OTHER PUBLICATIONS

Elmér, et al., Synthesis and Characterization of Poly (ethylene oxide-co-ethylene carbonate) Macromonomers and Their Use in the Preparation of Crosslinked Polymer Electrolytes, Journal of Polymer Science, vol. 44, pp. 2195-2205. (2006).
(Continued)

*Primary Examiner* — Jeremiah R Smith
(74) *Attorney, Agent, or Firm* — Lee IP Law, PC

(57) ABSTRACT

A polymer electrolyte for a lithium secondary battery includes a polymer represented by Formula 1 below, Formula 1

(Continued)

wherein a and b are each independently an integer from 1 to 5, and n is an integer from 1 to 1,000. A lithium secondary battery includes the polymer electrolyte.

16 Claims, 5 Drawing Sheets

(51) Int. Cl.
*H01M 10/052* (2010.01)
*H01M 10/0525* (2010.01)

(52) U.S. Cl.
CPC .... *H01M 10/0525* (2013.01); *H01M 2220/20* (2013.01); *H01M 2300/0082* (2013.01); *H01M 2300/0085* (2013.01); *H01M 2300/0091* (2013.01); *Y02T 10/7011* (2013.01)

(56) References Cited

U.S. PATENT DOCUMENTS

| | | | |
|---|---|---|---|
| 7,022,264 B2 | 4/2006 | Takeuchi et al. | |
| 2014/0011095 A1* | 1/2014 | Lee | H01M 10/056 429/309 |
| 2014/0186717 A1* | 7/2014 | Wang | H01M 4/608 429/303 |
| 2015/0079485 A1 | 3/2015 | Choi et al. | |

FOREIGN PATENT DOCUMENTS

| | | | |
|---|---|---|---|
| JP | 2004-519067 A | 6/2004 | |
| WO | WO 00/074158 | * 12/2000 | ............. H01M 6/18 |
| WO | WO 02/13298 A1 | 2/2002 | |

OTHER PUBLICATIONS

Elmér, et al., Polymer Electrolyte Membranes by In Situ Polymerization of Poly (ethylene carbonate-co-ethylene oxide) Macromonomers in Blends with Poly (vinylidene fluoride-co-hexafluoropropylene), Journal of Polymer Science, vol. 45, pp. 79-90 (2007).

Extended European Search Report issued by the European Patent Office dated Mar. 20, 2017 in the examination of the European Patent Application No. 17 153 314.4.

European Examination Report issued by the European Patent Office dated Feb. 12, 2018 in the examination of the European Patent Application No. 17 153 314.4.

* cited by examiner

POLYMER ELECTROLYTE FOR LITHIUM SECONDARY BATTERY AND LITHIUM SECONDARY BATTERY INCLUDING THE SAME

CROSS-REFERENCE TO RELATED APPLICATION

Korean Patent Application No. 10-2016-0011830, filed on Jan. 29, 2016, in the Korean Intellectual Property Office, and entitled: "Polymer Electrolyte for Lithium Secondary Battery and Lithium Secondary Battery Including the Same," is incorporated by reference herein in its entirety.

BACKGROUND

1. Field

Embodiments relate to a polymer electrolyte for a lithium secondary battery and a lithium secondary battery including the same.

2. Description of the Related Art

Lithium secondary batteries, which are high performance secondary batteries with the highest energy density among commercially available secondary batteries, may be used in various fields such as electric vehicles.

SUMMARY

Embodiments are directed to a polymer electrolyte for a lithium secondary battery including a polymer represented by Formula 1 below:

Formula 1

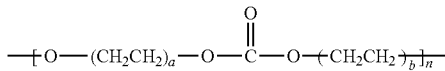

wherein a and b are each independently an integer from 1 to 5, and n is an integer from 1 to 1,000.

A weight average molecular weight of the polymer may be 2,000 g/mol or greater.

The polymer represented by Formula 1 may be a polymer represented by Formula 2 below:

Formula 2

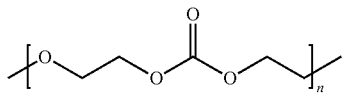

wherein n is an integer from 1 to 1,000.

An amount of the polymer represented by Formula 1 may be in the range of about 20 to about 99 parts by weight based on 100 parts by weight of the polymer electrolyte.

The polymer electrolyte may include a lithium salt.

The lithium salt may include at least one selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (where x and y are natural numbers), LiF, LiBr, LiCl, LiOH, LiI, LiB(C$_2$O$_4$)$_2$ (lithium bis(oxalato) borate (LiBOB)), Li(FSO$_2$)$_2$N, Li(CF$_3$SO$_2$)$_2$N, Li(C$_2$F$_5$SO$_2$)$_2$N, LiN(C$_p$F$_{2p+1}$SO$_2$)(C$_q$F$_{2q+1}$SO$_2$) (where p and q are different and each independently an integer from 1 to 20), LiN((SO$_2$)$_2$C$_p$F$_{2p}$) (where p is an integer from 1 to 10), Li(C$_6$F$_5$SO$_2$)$_2$N, Li(C$_{10}$F$_7$SO$_2$)$_2$N, Li(C$_6$F$_5$SO$_2$)(C$_{10}$F$_7$SO$_2$)N, LiN(C$_6$F$_5$SO$_2$)(C$_p$F$_{2p+1}$SO$_2$) (where p is an integer from 1 to 10), and LiN(C$_{10}$F$_7$SO$_2$)(C$_p$F$_{2p+1}$SO$_2$) (where p is an integer from 1 to 10).

The polymer electrolyte further may include non-ion-conductive inorganic particles or ion-conductive inorganic particles.

The non-ion-conductive inorganic particles may include at least one selected from SiO$_2$, TiO$_2$, ZnO, Al$_2$O$_3$, BaTiO$_3$, Pb(Zr,Ti)O$_3$ (PZT), Pb$_{1-x}$La$_x$Zr$_{1-y}$Ti$_y$O$_3$ (PLZT, where 0≤x<1, and 0≤y<1), PB(Mg$_3$Nb$_{2/3}$)O$_3$—PbTiO$_3$ (PMN-PT), HfO$_2$, SrTiO$_3$, SnO$_2$, CeO$_2$, Na$_2$O, MgO, NiO, CaO, BaO, ZrO$_2$, Y$_2$O$_3$, SiC, lithium phosphate (Li$_3$PO$_4$), and BaTiO$_3$.

An amount of the non-ion-conductive inorganic particles or ion-conductive inorganic particles may be in the range of about 1 to about 40 parts by weight based on 100 parts by weight of the polymer electrolyte.

The ion-conductive inorganic particles may include at least one selected from a glassy active metal ion conductor, an amorphous active metal ion conductor, a ceramic active metal ion conductor, and a glass-ceramic active metal ion conductor or a combination thereof.

The ion-conductive inorganic particles may include Li$_{1+x+y}$Al$_x$Ti$_{2-x}$Si$_y$P$_{3-y}$O$_{12}$ (where 0<x<2 and 0≤y<3), lithium titanium phosphate (Li$_x$Ti$_y$(PO$_4$)$_3$, where 0<x<2, and 0<y<3), lithium aluminum titanium phosphate (Li$_x$Al$_y$Ti$_z$(PO$_4$)$_3$, where 0<x<2, 0<y<1, and 0<z<3), Li$_{1+x+y}$(Al, Ga)$_x$(Ti, Ge)$_{2-x}$Si$_y$P$_{3-y}$O$_{12}$ (where 0≤x≤1 and 0≤y≤1), lithium lanthanum titanate (Li$_x$La$_y$TiO$_3$, where 0<x<2, and 0<y<3), lithium germanium thiophosphate (Li$_x$Ge$_y$P$_z$S$_w$, where 0<x<4, 0<y<1, 0<z<1, and 0<w<5), lithium nitride (Li$_x$N$_y$, where 0<x<4, and 0<y<2), SiS$_2$ (Li$_x$Si$_y$S$_z$) type glass (where 0<x<3, 0<y<2, and 0<z<4), P$_2$S$_5$ (Li$_x$P$_y$S$_z$) type glass (where 0<x<3, 0<y<3, and 0<z<7), Li$_2$O, LiF, LiOH, Li$_2$CO$_3$, LiAlO$_2$, Li$_2$O—Al$_2$O$_3$—SiO$_2$—P$_2$O$_5$—TiO$_2$—GeO$_2$-based ceramics, Garnet-based ceramics (Li$_{3+x}$La$_3$M$_2$O$_{12}$, where 0≤x≤5, and M=Te, Nb, or Zr), or a combination thereof.

Embodiments are also directed to a lithium secondary battery including a polymer electrolyte for a lithium secondary battery including a polymer represented by Formula 1 below:

Formula 1

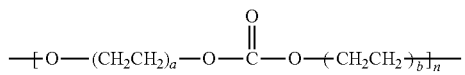

wherein a and b are each independently an integer from 1 to 5, and n is an integer from 1 to 1,000.

A weight average molecular weight of the polymer may be 2,000 g/mol or greater.

The polymer represented by Formula 1 may be a polymer represented by Formula 2 below:

Formula 2

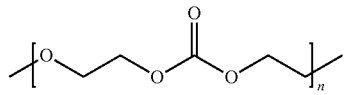

wherein n is an integer from 1 to 1,000.

An amount of the polymer represented by Formula 1 may be in the range of about 20 to about 99 parts by weight based on 100 parts by weight of the polymer electrolyte.

The polymer electrolyte may include a lithium salt.

The lithium salt may include at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI, $LiB(C_2O_4)_2$ (lithium bis(oxalato) borate (LiBOB)), $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (where p and q are different and each independently an integer from 1 to 20), $LiN((SO_2)_2C_pF_{2p})$ (where p is an integer from 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (where p is an integer from 1 to 10), and $LiN(C_{10}F_7SO_2)(C_pF_{2p+1}SO_2)$ (where p is an integer from 1 to 10).

The polymer electrolyte may further include non-ion-conductive inorganic particles or ion-conductive inorganic particles. An amount of the non-ion-conductive inorganic particles or ion-conductive inorganic particles may be in the range of about 1 to about 40 parts by weight based on 100 parts by weight of the polymer electrolyte.

The non-ion-conductive inorganic particles may include at least one selected from $SiO_2$, $TiO_2$, ZnO, $Al_2O_3$, $BaTiO_3$, $Pb(Zr,Ti)O_3$ (PZT), $Pb_{1-x}La_xZr_{1-y}Ti_yO_3$ (PLZT, where $0 \le x < 1$, and $0 \le y < 1$), $PB(Mg_{3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, $ZrO_2$, $Y_2O_3$, SiC, lithium phosphate ($Li_3PO_4$), and $BaTiO_3$. The ion-conductive inorganic particles may include at least one selected from a glassy active metal ion conductor, an amorphous active metal ion conductor, a ceramic active metal ion conductor, and a glass-ceramic active metal ion conductor or a combination thereof.

The ion-conductive inorganic particles may include $Li_{1+x+y}Al_xTi_{2-x}Si_yP_{3-y}O_{12}$ (where $0<x<2$ and $0\le y<3$), lithium titanium phosphate ($Li_xTi_y(PO_4)_3$, where $0<x<2$, and $0<y<3$), lithium aluminum titanium phosphate ($Li_xAl_yTi_z(PO_4)_3$, where $0<x<2$, $0<y<1$, and $0<z<3$), $Li_{1+x+y}(Al, Ga)_x(Ti, Ge)_{2-x}Si_yP_{3-y}O_{12}$ (where $0 \le x \le 1$ and $0 \le y \le 1$), lithium lanthanum titanate ($Li_xLa_yTiO_3$, where $0<x<2$, and $0<y<3$), lithium germanium thiophosphate ($Li_xGe_yP_zS_w$, where $0<x<4$, $0<y<1$, $0<z<1$, and $0<w<5$), lithium nitride ($Li_xN_y$, where $0<x<4$, and $0<y<2$), $SiS_2(Li_xSi_yS_z)$ type glass (where $0<x<3$, $0<y<2$, and $0<z<4$), $P_2S_5(Li_xP_yS_z)$ type glass (where $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, Garnet-based ceramics ($Li_{3+x}La_3M_2O_{12}$, where $0 \le x \le 5$, and M=Te, Nb, or Zr), or a combination thereof.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
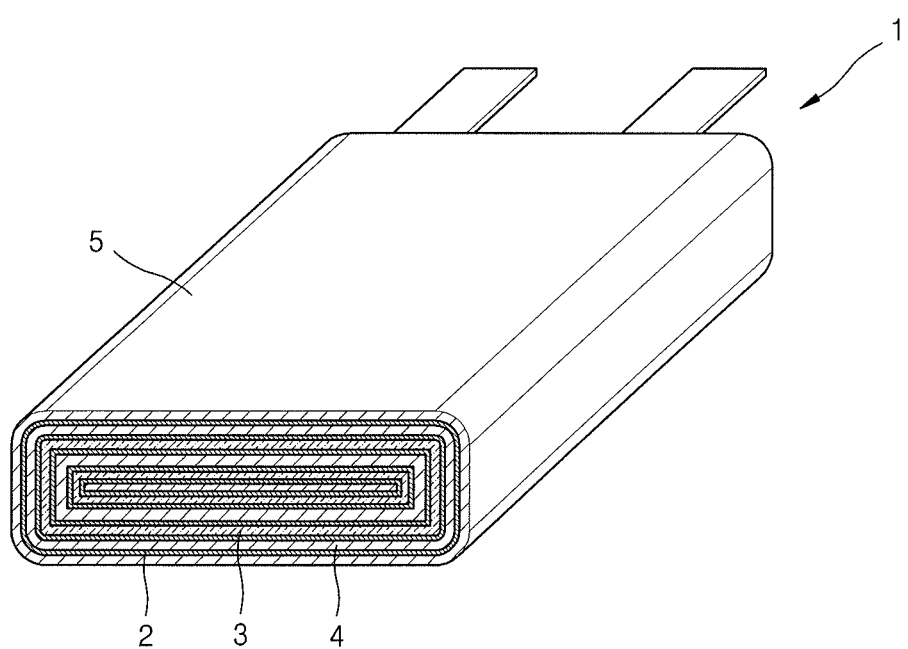
FIG. 1 schematically illustrates a structure of a lithium secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

A polymer electrolyte for a lithium secondary battery including a polymer represented by Formula 1 below is provided.

Formula 1

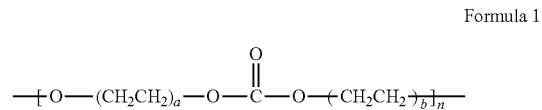

In Formula 1, a and b are each independently an integer from 1 to 5, and n is an integer from 1 to 1,000, or, for example, an integer from 1 to 600. It is to be understood that Formula 1 represents only the repeating unit of the polymer and that the polymer may be terminated on each end by a suitable terminal group In Formula 1, a and b are each an integer from 1 to 3.

A weight average molecular weight of the polymer may be 2,000 g/mol or greater, or, for example, in the range of about 2,000 to about 130,000 g/mol. When the weight average molecular weight of the polymer of Formula 1 is within this range, a polymer electrolyte forming composition may have an appropriate viscosity to prepare the polymer electrolyte and may have a high ability to dissolve a lithium salt to increase an ionic conductivity of the polymer electrolyte. A lithium secondary battery having enhanced oxidation stability may be manufactured by using the polymer electrolyte.

For example, the polymer represented by Formula 1 may be a polymer represented by Formula 2 below.

Formula 2

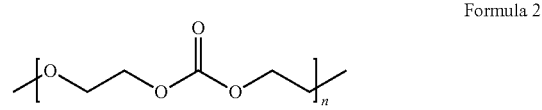

In Formula 2, n is an integer from 1 to 1,000.

An amount of the polymer represented by Formula 1 may be in the range of about 20 to about 99 parts by weight, or, for example, in the range of about 30 to about 90 parts by weight, based on 100 parts by weight of the polymer electrolyte. When the amount of the polymer represented by Formula 1 is within this range in the polymer electrolyte, a lithium secondary battery having excellent mechanical properties and enhanced oxidation stability may be manufactured.

The polymer electrolyte according to an embodiment may include a lithium salt.

The lithium salt may include at least one selected from LiPF$_6$, LiBF$_4$, LiSbF$_6$, LiAsF$_6$, LiN(SO$_2$C$_2$F$_5$)$_2$, Li(CF$_3$SO$_2$)$_2$N (LiTFSI), LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (where x and y are natural numbers), LiF, LiBr, LiCl, LiOH, LiI, LiB(C$_2$O$_4$)$_2$ (lithium bis(oxalato) borate (LiBOB)), Li(FSO$_2$)$_2$N, Li(CF$_3$SO$_2$)$_2$N, Li(C$_2$F$_5$SO$_2$)$_2$N, LiN(C$_p$F$_{2p+1}$SO$_2$)(C$_9$F$_{2q+1}$SO$_2$) (where p and q are different and each independently an integer from 1 to 20), LiN((SO$_2$)$_2$C$_p$F$_{2p}$) (where p is an integer from 1 to 10), Li(C$_6$F$_5$SO$_2$)$_2$N, Li(C$_{10}$F$_7$SO$_2$)$_2$N, Li(C$_6$F$_5$SO$_2$)(C$_{10}$F$_7$SO$_2$)N, LiN(C$_6$F$_5$SO$_2$)(C$_p$F$_{2p+1}$SO$_2$) (where p is an integer from 1 to 10), and LiN(C$_{10}$F$_7$SO$_2$)(C$_p$F$_{2p+1}$SO$_2$) (where p is an integer from 1 to 10).

An amount of the lithium salt may be in the range of 0.1 to 2 mol per 1 mol of a repeating unit monomer of the polymer represented by Formula 1. When the amount of the lithium salt is within this range, the polymer electrolyte may have excellent ionic conductivity.

The polymer electrolyte may have excellent ionic conductivity even when an organic solvent is not contained therein. The polymer electrolyte may be used in a lithium secondary battery.

The lithium secondary battery may be a lithium metal battery using a lithium metal as an anode.

According to an embodiment, the polymer electrolyte may include an organic solvent.

The organic solvent may be a carbonate-based compound, a glyme-based compound, a dioxolane-based compound, or the like. The carbonate-based compound may be ethylene carbonate, propylene carbonate, dimethyl carbonate, fluoroethylene carbonate, diethyl carbonate, or ethylmethyl carbonate. The glyme-based compound may include at least one selected from poly(ethylene glycol) dimethyl ether, tetra(ethylene glycol) dimethyl ether, tri(ethylene glycol) dimethyl ether, poly(ethylene glycol) dilaurate, poly(ethylene glycol) monoacrylate, and poly(ethylene glycol) diacrylate.

The dioxolane-based compound may include at least one selected from 3-dioxolane, 4,5-diethyl-dioxolane, 4,5-dimethyl-dioxolane, 4-methyl-1,3-dioxolane, and 4-ethyl-1,3-dioxolane. Examples of the organic solvent may include 2,2-dimethoxy-2-phenylacetophenone, 1,2-dimethoxyethane (DME), 1,2-diethoxyethane, tetrahydrofuran, γ-butyrolactone, and 1,1,2,2-tetrafluoroethyl 2,2,3,3-tetrafluoropropyl ether.

For example, the organic solvent may include at least one selected from ethylene carbonate, dimethyl carbonate, diethyl carbonate, ethylmethyl carbonate, fluoroethylene carbonate, 1,2-dimethoxy ethane, 1,2-diethoxy ethane, diethylene glycol dimethyl ether, trimethylene glycol dimethyl ether, tetraethylene glycol dimethyl ether, polyethylene glycol dimethyl ether, succinonitrile, sulfolane, dimethyl sulfone, ethylmethyl sulfone, diethyl sulfone, adiponitrile, and 1,1,2,2,-tetrafluoroethyl 2,2,3,3-tetrafluoropropyl ether.

According to an embodiment, the polymer electrolyte may further include non-ion-conductive inorganic particles or ion-conductive inorganic particles.

The non-ion-conductive inorganic particles may include at least one selected from SiO$_2$, TiO$_2$, ZnO, Al$_2$O$_3$, BaTiO$_3$, Pb(Zr,Ti)O$_3$ (PZT), Pb$_{1-x}$La$_x$Zr$_{1-y}$Ti$_y$O$_3$(PLZT, where 0≤x<1, and 0≤y<1), PB(Mg$_3$Nb$_{2/3}$)O$_3$—PbTiO$_3$(PMN-PT), HfO$_2$, SrTiO$_3$, SnO$_2$, CeO$_2$, Na$_2$O, MgO, NiO, CaO, BaO, ZrO$_2$, Y$_2$O$_3$, SiC, lithium phosphate (Li$_3$PO$_4$), and BaTiO$_3$. The ion-conductive inorganic particles may include at least one selected from a glassy active metal ion conductor, an amorphous active metal ion conductor, a ceramic active metal ion conductor, and a glass-ceramic active metal ion conductor or a combination thereof.

The ion-conductive inorganic particles may include at least one selected from Li$_{1+x+y}$Al$_x$Ti$_{2-x}$Si$_y$P$_{3-y}$O$_{12}$ (where 0<x<2 and 0≤y<3), lithium titanium phosphate (Li$_x$Ti$_y$(PO$_4$)$_3$, where 0<x<2, and 0<y<3), lithium aluminum titanium phosphate (Li$_x$Al$_y$Ti$_z$(PO$_4$)$_3$, where 0<x<2, 0<y<1, and 0<z<3), Ga)$_x$(Ti, Ge)$_{2-x}$Si$_y$P$_{3-y}$O$_{12}$ (where 0≤x≤1 and 0≤y≤1), lithium lanthanum titanate (Li$_x$La$_y$TiO$_3$, where 0<x<2, and 0<y<3), lithium germanium thiophosphate (Li$_x$Ge$_y$P$_z$S$_w$, where 0<x<4, 0<y<1, 0<z<1, and 0<w<5), lithium nitride (Li$_x$N$_y$, where 0<x<4, and 0<y<2), SiS$_2$ (Li$_x$Si$_y$S$_z$) type glass (where 0<x<3, 0<y<2, and 0<z<4), P$_2$S$_5$(Li$_x$P$_y$S$_z$) type glass (where 0<x<3, 0<y<3, and 0<z<7), Li$_2$O, LiF, LiOH, Li$_2$CO$_3$, LiAlO$_2$, Li$_2$O—Al$_2$O$_3$—SiO$_2$—P$_2$O$_5$—TiO$_2$—GeO$_2$-based ceramics, garnet-based ceramics (Li$_{3+x}$La$_3$M$_2$O$_{12}$, where 0≤x≤5, and M=Te, Nb, or Zr), or a combination thereof.

When the polymer electrolyte further includes the non-ion-conductive inorganic particles or ion-conductive inorganic particles as described above, the polymer electrolyte may have improved mechanical properties. An average particle diameter of the non-ion-conductive inorganic particles or ion-conductive inorganic particles may be 1 μm or less, or, for example, 500 nm or less, or, for example, 100 nm or less. For example, the average particle diameter of the non-ion-conductive inorganic particles or ion-conductive inorganic particles may be in the range of about 1 nm to about 100 nm, or, for example, in the range of about 10 nm to about 100 nm, or, for example, in the range of about 30 nm to about 70 nm. When the average particle diameter of the non-ion-conductive inorganic particles or ion-conductive inorganic particles is within the ranges described above, the polymer electrolyte may have high film forming ability and excellent mechanical properties with no reduction in ionic conductivity.

When the polymer electrolyte includes the non-ion-conductive inorganic particles or ion-conductive inorganic particles, an amount of the non-ion-conductive inorganic particles or ion-conductive inorganic particles may be in the range of about 1 to about 40 parts by weight, or, for example, in the range of about 5 to about 20 parts by weight, based on 100 parts by weight of the polymer electrolyte. When the amount of the non-ion-conductive inorganic particles or ion-conductive inorganic particles is within this range, the polymer electrolyte may have excellent mechanical properties and high ionic conductivity.

The polymer electrolyte may have an ionic conductivity of 1×10$^{-4}$ S/cm or greater, or, for example, 5×10$^{-4}$ S/cm or greater, or, for example, 1×10$^{-3}$ S/cm or greater, at a temperature of about 25° C.

The lithium secondary battery according to an embodiment may have a structure in which the solid electrolyte according to an embodiment is disposed between a lithium metal anode and a cathode.

The lithium secondary battery according to an embodiment may further include a separator. The separator may include polyethylene, polypropylene, or polyvinylidene fluoride, or may have a multi-layered structure including two or more layers thereof. A mixed multi-layered structure such as a polyethylene/polypropylene double-layered separator, a polyethylene/polypropylene/polyethylene triple-layered separator, or a polypropylene/polyethylene/polypropylene triple-layered separator may be used. An electrolyte including a lithium salt and an organic solvent may further be added to the separator.

The lithium secondary battery according to an embodiment may further include a non-woven fabric or polymer mesh. The non-woven fabric may include, for example, polyacrylonitrile, polytetrafluoroethylene-hexafluoropropylene, or polyvinylidene fluoride. The polymer mesh may include, for example, polyethylene terephthalate or polyarylate. An electrolyte including a lithium salt and an organic solvent may further be added to the non-woven fabric or polymer mesh.

The lithium secondary battery may be, for example, a lithium metal battery including a lithium metal anode. By using the polymer electrolyte according to an embodiment, a lithium secondary battery having high safety and long lifespan may be manufactured.

The cathode may be a porous cathode.

The porous cathode may include pores or may be a cathode into which a liquid electrolyte is infiltrated by capillary action.

For example, the porous cathode may include a cathode obtained by coating a cathode active material composition including a cathode active material, a conductive agent, a binder, and a solvent and drying the coating. The obtained cathode may have pores formed between particles of the cathode active material. A liquid electrolyte may be impregnated in the porous cathode.

According to an embodiment, the cathode may further include a liquid electrolyte, a gel electrolyte, or a solid electrolyte. A liquid electrolyte, gel electrolyte, or solid electrolytes that does not react with and deteriorate a cathode active material during charging and discharging may be used.

FIG. 1 schematically illustrates a structure of a lithium secondary battery according to an embodiment.

Referring to FIG. 1, the lithium secondary battery may include a cathode 2, an anode 3, and a polymer electrolyte 4 disposed between the cathode 2 and the anode 3.

The lithium secondary battery including the polymer electrolyte may have a suitable shape, such as, for example, a rectangular, cylindrical, or pouch shape. For example, in FIG. 1, a rectangular type lithium ion battery 1 including a case 5 covering the cathode 2, the anode 3, and the electrolyte 4 is illustrated.

Hereinafter, a method of preparing the lithium secondary battery according to an embodiment will be described.

The polymer represented by Formula 1 below, an organic solvent, and a lithium salt may be mixed to prepare a polymer electrolyte forming composition.

Formula 1

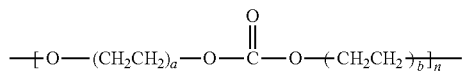

In Formula 1, a and b are each independently an integer from 1 to 5, and n is an integer from 1 to 1,000.

The organic solvent may be omitted in the preparation of the polymer electrolyte forming composition depending on the type of the polymer of Formula 1.

The polymer electrolyte forming composition may be coated onto the anode and dried to form a polymer electrolyte on the anode. The drying may be performed at a temperature of about 25 to about 60° C.

In some implementations, the polymer electrolyte may be prepared by forming a film by coating the polymer electrolyte forming composition onto a separate support substrate and drying the composition, and separating the dried film. The separate support substrate may be a Mylar film, a glass substrate, polyethylene terephthalate, polytetrafluoroethylene, or the like.

The polymer electrolyte may have a thickness of about 10 to about 100 μm. When the thickness of the polymer electrolyte is within this range, the polymer electrolyte may have excellent mechanical properties.

A suitable organic solvent useful in the art in the preparation of an polymer electrolyte forming composition may be used. For example, tetrahydrofuran, N-methylpyrrolidone, acetonitrile, benzonitrile, 2-methyltetrahydrofuran, γ-butyrolactone, dioxolane, 4-methyldioxolane, N, N-dimethylformamide, N,N-dimethylacetamide, dimethylsulfoxide, dioxane, 1,2-dimethoxyethane, 1,2-diethoxyethane, sulfolane, dichloroethane, chlorobenzene, nitrobenzene, diethylene glycol, dimethyl ether, or mixtures thereof may be used. An amount of the organic solvent may be in the range of about 100 to about 4,000 parts by weight based on 100 parts by weight of the polymer of Formula 1.

The polymer electrolyte forming composition may further include non-ion-conductive inorganic particles or ion-conductive inorganic particles.

The polymer electrolyte forming composition may be coated by using a suitable method useful in the art in the formation of the polymer electrolyte. For example, spin coating, roll coating, curtain coating, extruding, casting, screen printing, inkjet printing, doctor blading, or the like, may be used.

The polymer electrolyte prepared according to the aforementioned process may be electrochemically stable to lithium in a voltage range of about 0 V to about 6.0 V, or for example, about 4.0 V to about 4.5 V. When the polymer electrolyte according to an embodiment has a wide electrochemically stable potential window, the polymer electrolyte may be applied to electrochemical devices operating in a high voltage.

The lithium secondary battery may further include a gel electrolyte and a solid electrolyte.

A suitable gel electrolyte having a gel shape may be used. For example, the gel electrolyte may include a polymer and a polymer ionic liquid. The polymer may be a solid graft (block) copolymer electrolyte.

The solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphoric acid ester polymer, poly agitation lysine, polyester sulfide, polyvinyl alcohol, polyvinylidene fluoride, and a polymer containing an ionic dissociation group.

Examples of the inorganic solid electrolyte may include $Li_3N$, $LiI$, $Li_5NI_2$, $Li_3N-LiI-LiOH$, $Li_2SiS_3$, $Li_4SiO_4$, $Li_4SiO_4-LiI-LiOH$, $Li_3PO_4-Li_2S-SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ ($0.1 \leq x \leq 0.9$), $Li_{1+x}Hf_{2-x}Al_x(PO_4)_3$ ($0.1 \leq x \leq 0.9$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M is a rare earth element such as Nd, Gd, and Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ ($X \leq 0.8$, $0 \leq Y \leq 1.0$, M is Nd, Sm, Eu, Gd, Tb, Dy, Ho, Er, Tm, or Yb), $Li_{1+x+y}Q_xTi_{2-x}Si_yP_{3-y}O_{12}$ ($0 < x \leq 0.4$, $0 < y \leq 0.6$, Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M is Nb or Ta), and $Li_{7+x}A_xLa_{3-x}Zr_2O_{12}$ ($0 < x < 3$ and A is Zn).

The lithium metal anode may be a lithium metal thin film electrode or a lithium metal alloy electrode. A lithium alloy may include lithium and a metal/metalloid alloyable with lithium. For example, the metal/metalloid alloyable with lithium may include Si, Sn, Al, Ge, Pb, Bi, Sb, Si—Y' alloy (Y' is an alkali metal, an alkali earth metal, a Groups XIII element, a Group XIV element, a transition metal, a rare earth element, or a combination thereof (except for Si)), Sn—Y" alloy (Y" is an alkali metal, an alkali earth metal, a Groups XIII element, a Group XIV element, a transition metal, a rare earth element, or a combination thereof (except for Sn)), and the like. In this regard, Y' or Y" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The cathode active material to prepare the cathode may be a suitable cathode active material useful in the art. The cathode active material include, for example, at least one selected from lithium cobalt oxide, lithium nickel cobalt manganese oxide, lithium nickel cobalt aluminum oxide, lithium iron phosphate, and lithium manganese oxide.

For example, a compound represented by $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $La_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < + \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$ may be used.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The cathode active material may be a compound represented by Formula 3 below, a compound represented by Formula 4 below, or a compound represented by Formula 5 below.

$$Li_aNi_bCo_cM_dO_2 \qquad \text{Formula 3}$$

In Formula 3, $0.90 \leq a \leq 1.8$, $0 \leq b \leq 0.9$, $0 \leq c \leq 0.5$, $0 \leq d \leq 0.5$, and M is Mn or Al.

$$Li_2MnO_3 \qquad \text{Formula 4}$$

$$LiMO_2 \qquad \text{Formula 5}$$

In Formula 5, M is Mn, Fe, Co, or Ni.

A cathode may be prepared according to the following method.

A cathode active material, a binder, and a solvent may be mixed to prepare a cathode active material composition.

The cathode active material composition may further include a conductive agent.

The cathode active material composition may be directly coated onto a metal current collector and dried to prepare a cathode plate. In some implementations, the cathode active material composition may be cast onto a separate support, and then a film separated from the support may be laminated on the current collector to prepare a cathode plate.

The binder may facilitate binding of the cathode active material to the conductive agent and binding to the current collector. An amount of the binder may be in the range of about 1 to about 50 parts by weight based on 100 parts by weight of a total weight of the cathode active material. Examples of the binder may include polyvinylidene fluoride, polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, ethylene-propylene-diene terpolymer (EPDM), sulfonated EPDM, styrene butadiene rubber, fluoride rubber, or various copolymers, as examples. An amount of the binder may be in the range of about 2 to about 5 parts by weight based on 100 parts by weight of the total weight of the cathode active material. When the amount of the binder is within this range, the active material layer may have strong binding force to the current collector.

The conductive agent may be a suitable current collector having high conductivity without causing a chemical change. For example, graphite such as natural graphite and artificial graphite; a carbonaceous material such as acetylene black, Ketjen black, channel black, furnace black, lamp black, and thermal black; a conductive fiber such as carbon fiber and metal fiber; a metal powder such as carbon fluoride powder, aluminum powder, and nickel powder; a conductive whisker such as zinc oxide and potassium titanate; a conductive metal oxide such as titanium oxide; and conductive materials such as polyphenylene derivatives may be used as the conductive agent.

An amount of the conductive agent may be in the range of about 1 to about 10 parts by weight, or, for example, about 2 to about 5 parts by weight based on 100 parts by weight of the total weight of the cathode active material. When the amount of the conductive agent is within this range, the cathode may have high conductivity.

The solvent may be, for example, N-methylpyrrolidone (NMP). An amount of the solvent may be in the range of about 100 to about 2,000 parts by weight based on 100 parts by weight of the cathode active material. When the amount of the solvent is within this range, a process of forming the active material layer is facilitated.

The lithium secondary battery according to an embodiment may have a long lifespan and high safety. The lithium secondary battery may be used not only in a battery cell used as a power source of small-sized devices, but also as a unit battery of middle or large-sized battery packs or battery modules including a plurality of battery cells used as power sources of middle or large-sized devices. The lithium metal battery according to an embodiment may be used in mobile phones, notebook computers, storage batteries for power generation facilities such as wind turbines and photovoltaic devices, electric vehicles, uninterruptible power supplies, and storage batteries for home use, due to high voltage, capacity, and energy density.

Examples of the middle or large-sized devices include electric vehicles (EVs), hybrid electric vehicles (HEVs), plug-in hybrid electric vehicles (PHEVs), electric motorcycles such as E-bikes and E-scooters, electric tools, or energy storage systems.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation Example 1: Polymer of Formula 2 (PEEC)

A synthesis process of preparing a polymer represented by Formula 2 below was performed in an inert (Ar) atmosphere.

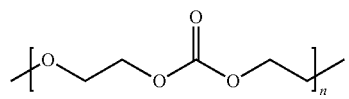

Formula 2

In Formula 2, n is about 120.

50.0 g (0.567 mol) of ethylene carbonate (EC) and 7.20 g (0.0114 mol) of dibutyltin diacetate (DBTDA) were added to a round-bottom flask, and the round-bottom flask was installed in an oil bath. A reaction mixture was stirred at about 165° C. for 48 hours.

After the reaction was completed, the reaction mixture was filtered using a glass frit funnel to remove an unreacted catalyst, or the like, and a filtrate was dissolved in chloroform. An excess of methanol was added to the resultant and a methanol layer was collected. This process was repeated about 5 times. Methanol was removed from the collected methanol layer to obtain a polymer of Formula 2.

A structure of the polymer of Formula 2 was identified in Evaluation Examples 1 to 3 below.

Example 1: Preparation of Polymer Electrolyte

The polymer represented by Formula 2 below (polyethylene ether carbonate (PEEC)) was added to acetonitrile and mixed to obtain a 5 wt % polymer mixture. A weight average molecular weight of the polymer of Formula 2 was about 16,000 g/mol.

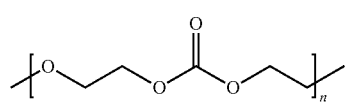

Formula 2

In Formula 2, n is about 120.

$LiClO_4$, as a lithium salt, was added to the polymer mixture to prepare a polymer electrolyte forming composition. An amount of $LiClO_4$ was 2 mol per 1 mol of a polymer monomer.

The polymer electrolyte forming composition was cast onto a glass support substrate and dried at about 60° C. A film-shaped polymer electrolyte was delaminated from the glass substrate to obtain a desired polymer electrolyte (thickness: 100 μm).

Examples 2-4: Preparation of Polymer Electrolyte

Polymer electrolytes were prepared in the same manner as in Example 1, except that 1 mol, 0.5 mol, 0.25 mol of $LiClO_4$ based on 1 mol of the polymer monomer were used, respectively.

Example 5: Preparation of Polymer Electrolyte

A polymer electrolyte was prepared in the same manner as in Example 1, except that $Li(CF_3SO_2)_2N$ (LiTFSI) was used instead of $LiClO_4$.

Examples 6-8: Preparation of Polymer Electrolyte

Polymer electrolytes were prepared in the same manner as in Example 5, except that 1 mol, 0.5 mol, 0.25 mol of LiTFSI based on 1 mol of the polymer monomer were used, respectively.

Comparative Example 1: Preparation of Polymer Electrolyte

A polymer electrolyte was prepared by mixing polyethylene oxide and $LiClO_4$ as a lithium salt. An amount of the lithium salt was about 0.056 mol based on 1 mol of the polymer monomer.

Evaluation Example 1: NMR Spectrum

The polymer of Formula 2 prepared according to Preparation Example 1 was analyzed by using nuclear magnetic resonance ($^1$H-NMR and $^1$H-$^1$H 2D NMR). A VNMRS 600 MHz manufactured by VARIAN, Inc. was used as an NMR spectrometer.

Figure 2:
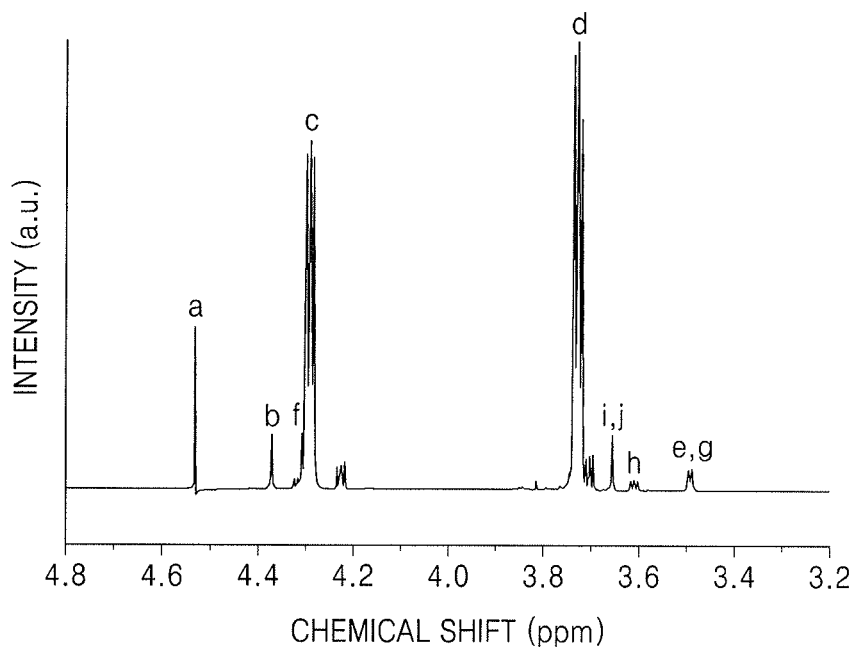
FIGS. 2 and 3 illustrate graphs respectively depicting results of analyzing the polymer of Formula 2 prepared according to Preparation Example 1 using nuclear magnetic resonance ($^1$H-NMR and $^1$H-$^1$H 2D NMR)
Figure 3:
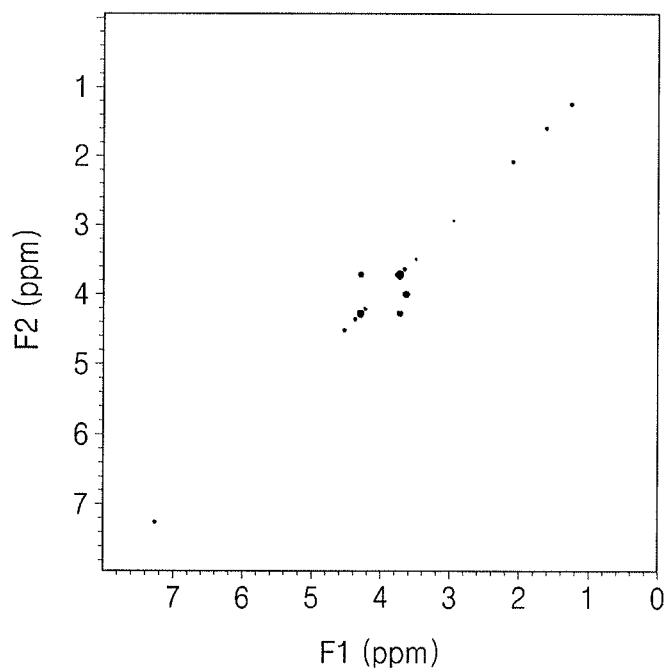

$^1$H-NMR analysis results and $^1$H-$^1$H 2D NMR analysis results are shown in FIGS. 2 and 3.

Referring to FIGS. 2 and 3, the structure of the polymer of Formula 2 was identified.

Evaluation Example 2: Mass Spectrometry

The polymer of Formula 2 prepared according to Preparation Example 1 was analyzed by using gel permeation chromatography (GPC). A HPLC2690 manufactured by Waters Corporation was used as a GPC analyzer.

Figure 4A:
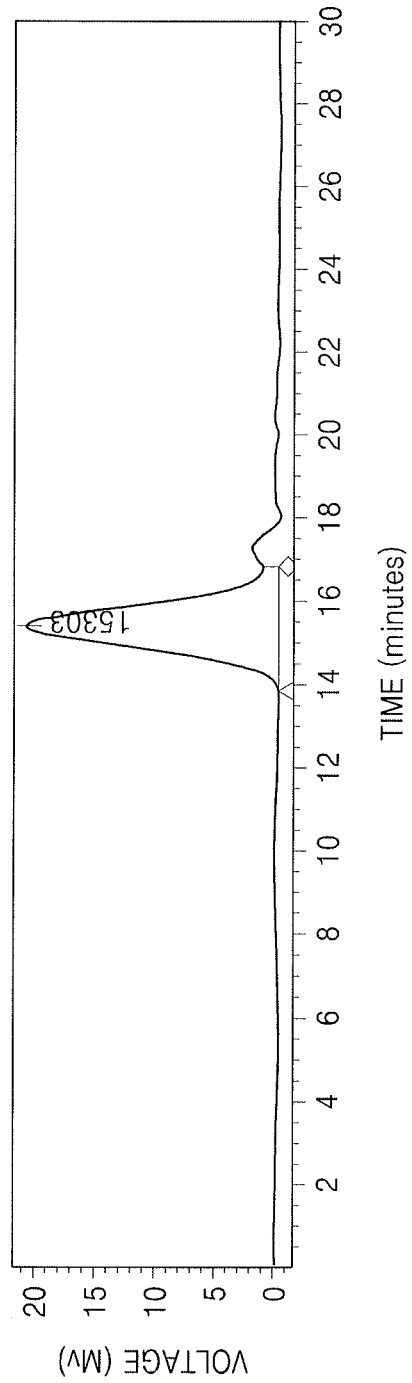
FIGS. 4A and 4B illustrate graphs depicting results of analyzing the polymer of Formula 2 prepared according to Preparation Example 1 using gel permeation chromatography (GPC)
Figure 4B:
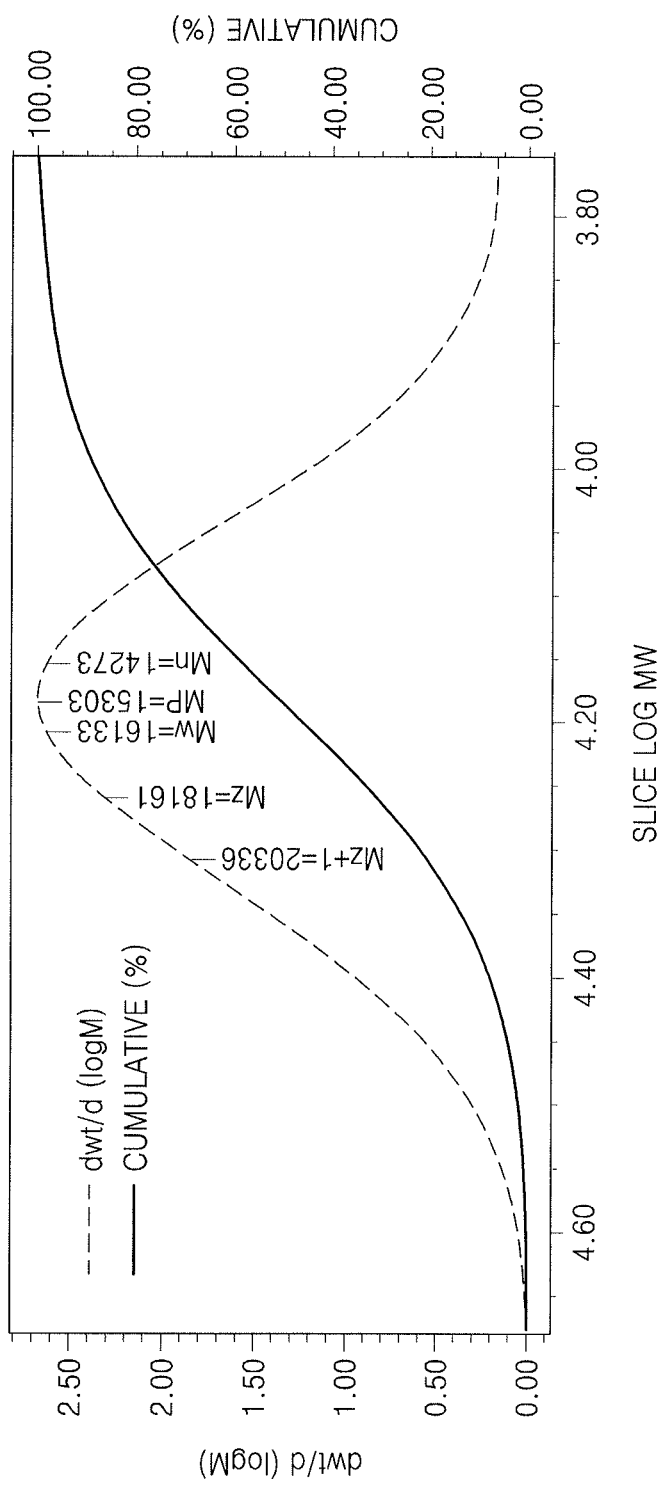

Analysis results are shown in FIGS. 4A and 4B and Table 1 below.

TABLE 1

| Peak name | RT | Area | Mn (Dalton) | Mw (Dalton) | MP (Dalton) | Mz (Dalton) | Polydispersity |
|---|---|---|---|---|---|---|---|
| PEEC | 15.412 | 1514851 | 14273 | 16133 | 15303 | 18161 | 1.130274 |

Referring to FIGS. 4A and 4B and Table 1, it was confirmed the polymer of Formula 2 was prepared.

Evaluation Example 3: Differential Scanning Calorimeter

The polymer represented by Formula 2 prepared according to Preparation Example 1 was analyzed by using a differential scanning calorimeter (DSC). The DSC analysis was performed using a SDT Q600 manufactured by TA instruments.

Figure 5:
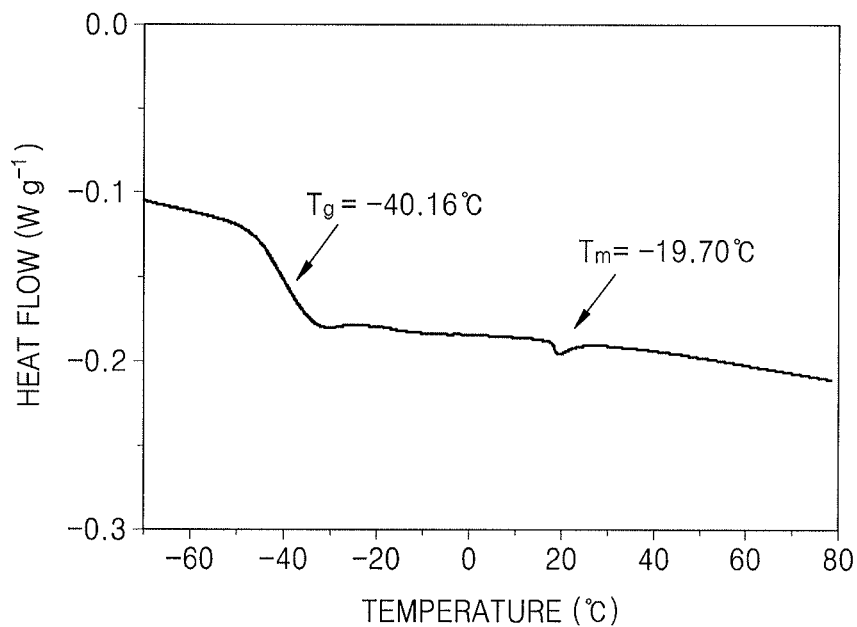
FIG. 5 illustrates a graph depicting results of analyzing the polymer of Formula 2 prepared according to Preparation Example 1 by using differential scanning calorimeter (DSC)

Results of the DSC analysis are shown in FIG. 5.

Referring to FIG. 5, it was confirmed that the polymer of Formula 2 has a glass transition temperature of about −40.16° C. Thus, flexibility and high ionic conductivity may be obtained at room temperature.

Evaluation Example 4: Ionic Conductivity

Conductivity of the polymer electrolytes prepared according to Examples 1 to 8 and Comparative Example 1 was measured by using the following method.

Ionic conductivity of the polymer electrolytes was evaluated by measuring resistance while scanning temperature after applying a voltage bias of 10 mV thereto in a frequency of about 1 Hz to about 1 MHz.

Ionic conductivity evaluation results are shown in Table 2 below.

TABLE 2

|  | Conductivity (S/cm) 25° C. | Conductivity (S/cm) 55° C. |
|---|---|---|
| Example 1 | $2.9 \times 10^{-5}$ | $2.6 \times 10^{-4}$ |
| Example 2 | $7.0 \times 10^{-6}$ | $9.0 \times 10^{-5}$ |
| Example 3 | $1.9 \times 10^{-6}$ | $3.2 \times 10^{-5}$ |
| Example 4 | $9.8 \times 10^{-6}$ | $2.0 \times 10^{-5}$ |
| Example 5 | $5.0 \times 10^{-5}$ | $4.1 \times 10^{-4}$ |
| Example 6 | $5.0 \times 10^{-5}$ | $3.8 \times 10^{-4}$ |
| Example 7 | $1.8 \times 10^{-5}$ | $2.0 \times 10^{-4}$ |
| Example 8 | $9.5 \times 10^{-7}$ | $2.6 \times 10^{-5}$ |
| Comparative Example 1 | $6.3 \times 10^{-7}$ | $1.7 \times 10^{-4}$ |

Referring to Table 2, the polymer electrolytes prepared according to Examples 1 to 7 exhibited improved ionic conductivity compared with the polymer electrolyte prepared according to Comparative Example 1.

Evaluation Example 5: Oxidation Stability

Cells were manufactured by interposing each of the polymer electrolytes prepared according to Examples 1 and 5 between a lithium electrode and a stainless steel electrode. Electrochemical stability of each cell was analyzed by Linear Sweep Voltammetry (LSV), and the results of LSV are shown in FIG. 6.

Conditions for the LSV analysis include a voltage of about 3V to about 5.5 V (V vs Li/Li$^+$), a scan rate of about 1 mV/s, and a temperature of about 55° C.

Figure 6:
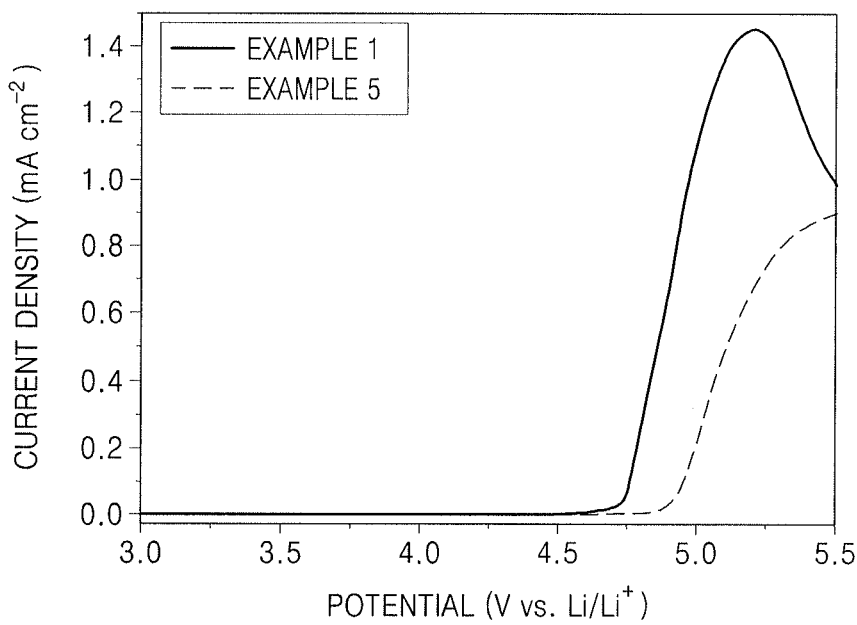
FIG. 6 illustrates a graph depicting oxidation stability evaluation results of the polymer electrolytes prepared according to Examples 1 and 5.

As illustrated in FIG. 6, it was confirmed that the polymer electrolytes prepared according to Examples 1 and 5 have excellent oxidation stability.

As described above, the polymer electrolyte according to an embodiment has excellent ionic conductivity. By using the polymer electrolyte, a lithium secondary battery having long lifespan and enhanced safety may be manufactured.

By way of summation and review, a lithium secondary battery may include a lithium metal thin film as an anode. When a lithium metal thin film is used as the anode in a lithium secondary battery that includes a liquid electrolyte, the anode may be highly reactive to the liquid electrolyte during charging and discharging due to the high reactivity of lithium. Thus, a solid electrolyte may be used instead of a liquid electrolyte to improve the safety of the lithium battery.

Polyethylene oxide polymer electrolytes have low oxidation stability. Accordingly, the operation of batteries including a polyethylene oxide polymer electrolyte may be difficult at a voltage of about 4.0 V or greater and such electrolytes may have low solubility to lithium salts, which limits amounts of lithium salts to be dissociated.

Thus, embodiments provide a polymer electrolyte having stable oxidation potentials at a voltage of 4.5 V or greater and improved ability to dissolve lithium salts compared to polyethylene oxide polymer electrolytes.

The polymer electrolyte may have excellent ionic conductivity due to improved ability to dissolve lithium salts. The polymer electrolyte may be used as a solid electrolyte without using a liquid electrolyte. Thus, a reduction reaction of a solvent may be inhibited in lithium metal batteries by using the polymer electrolyte, thereby increasing lifespan and improving stability in the batteries.

Embodiments further provide a lithium secondary battery having a long lifespan and enhanced safety by employing the polymer electrolyte.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A polymer electrolyte for a lithium secondary battery, the polymer electrolyte comprising polyethylene ether carbonate having a weight average molecular weight of 2,000 g/mol or greater, the polyethylene ether carbonate being represented by Formula 2 below:

Formula 2

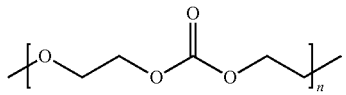

wherein n is an integer from about 100 to 1,000.

2. The polymer electrolyte for a lithium secondary battery as claimed in claim 1, wherein an amount of the polyethylene ether carbonate is in the range of about 20 to about 99 parts by weight based on 100 parts by weight of the polymer electrolyte.

3. The polymer electrolyte for a lithium secondary battery as claimed in claim 1, wherein the polymer electrolyte includes a lithium salt.

4. The polymer electrolyte for a lithium secondary battery as claimed in claim 3, wherein the lithium salt includes at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, in which x and y are natural numbers, LiF, LiBr, LiCl, LiOH, LiI, $LiB(C_2O_4)_2$ (lithium bis(oxalato) borate (LiBOB)), $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$, in which p and q are different and each independently an integer from 1 to 20, $LiN((SO_2)_2C_pF_{2p})$, in which p is an integer from 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$, in which p is an integer from 1 to 10, and $LiN(C_{10}F_7SO_2)(C_pF_{2p+1}SO_2)$, in which p is an integer from 1 to 10.

5. The polymer electrolyte for a lithium secondary battery as claimed in claim 1, wherein the polymer electrolyte further includes non-ion-conductive inorganic particles or ion-conductive inorganic particles.

6. The polymer electrolyte for a lithium secondary battery as claimed in claim 5, wherein:
the electrolyte includes the non-ion-conductive particles, and
the non-ion-conductive inorganic particles include at least one selected from $SiO_2$, $TiO_2$, ZnO, $Al_2O_3$, $BaTiO_3$, $Pb(Zr,Ti)O_3$ (PZT), $Pb_{1-x}La_xZr_{1-y}Ti_yO_3$ (PLZT), in which 0≤x<1, and 0≤y<1, $PB(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, $ZrO_2$, $Y_2O_3$, SiC, lithium phosphate ($Li_3PO_4$), and $BaTiO_3$.

7. The polymer electrolyte for a lithium secondary battery as claimed in claim 5, wherein an amount of the non-ion-conductive inorganic particles or ion-conductive inorganic particles is in the range of about 1 to about 40 parts by weight based on 100 parts by weight of the polymer electrolyte.

8. The polymer electrolyte for a lithium secondary battery as claimed in claim 5, wherein:
the electrolyte includes the ion-conductive particles, and
the ion-conductive inorganic particles include at least one selected from a glassy active metal ion conductor, an amorphous active metal ion conductor, a ceramic active metal ion conductor, and a glass-ceramic active metal ion conductor or a combination thereof.

9. The polymer electrolyte for a lithium secondary battery as claimed in claim 8, wherein the ion-conductive inorganic particles include $Li_{1+x+y}Al_xTi_{2-x}Si_yP_{3-y}O_{12}$, in which 0<x<2 and 0≤y<3, lithium titanium phosphate $Li_xTi_y(PO_4)_3$, in which 0<x<2, and 0<y<3, lithium aluminum titanium phosphate $Li_xAl_yTi_z(PO_4)_3$, in which 0<x<2, 0≤y<1, and 0<z<3, $Li_{1+x+y}(Al, Ga)_x(Ti, Ge)_{2-x}Si_yP_{3-y}O_{12}$, in which 0≤x≤1 and 0≤y≤1, lithium lanthanum titanate ($Li_xLa_yTiO_3$), in which 0<x<2, and 0<y<3, lithium germanium thiophosphate ($Li_xGe_yP_zS_w$), in which 0<x<4, 0<y<1, 0<z<1, and 0<w<5, lithium nitride ($Li_xN_y$), in which 0<x<4, and 0<y<2, $SiS_2(Li_xSi_yS_z)$ type glass, in which 0<x<3, 0<y<2, and 0<z<4, $P_2S_5(Li_xP_yS_z)$ type glass, in which 0<x<3, 0<y<3, and 0<z<7, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, garnet-based ceramics ($Li_{3+x}La_3M_2O_{12}$), in which 0≤x≤5, and M=Te, Nb, or Zr, or a combination thereof.

10. A lithium secondary battery comprising the polymer electrolyte as claimed in claim 1.

11. The lithium secondary battery as claimed in claim 10, wherein an amount of the polyethylene ether carbonate is in the range of about 20 to about 99 parts by weight based on 100 parts by weight of the polymer electrolyte.

12. The lithium secondary battery as claimed in claim 10, wherein the polymer electrolyte includes a lithium salt.

13. The lithium secondary battery as claimed in claim 12, wherein the lithium salt includes at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, in which x and y are natural numbers, LiF, LiBr, LiCl, LiOH, LiI, $LiB(C_2O_4)_2$ (lithium bis(oxalato) borate (LiBOB)), $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$, in which p and q are different and each independently an integer from 1 to 20, $LiN((SO_2)_2C_pF_{2p})$, in which p is an integer from 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$, in which p is an integer from 1 to 10, and $LiN(C_{10}F_7SO_2)(C_pF_{2p+1}SO_2)$, in which p is an integer from 1 to 10.

14. The lithium secondary battery as claimed in claim 10, wherein:
the polymer electrolyte further includes non-ion-conductive inorganic particles or ion-conductive inorganic particles, and
an amount of the non-ion-conductive inorganic particles or ion-conductive inorganic particles is in the range of about 1 to about 40 parts by weight based on 100 parts by weight of the polymer electrolyte.

15. The lithium secondary battery as claimed in claim 14, wherein:
the polymer electrolyte includes the non-ion-conductive inorganic particles and the ion-conductive inorganic particles,
the non-ion-conductive inorganic particles include at least one selected from $SiO_2$, $TiO_2$, ZnO, $Al_2O_3$, $BaTiO_3$, $Pb(Zr,Ti)_{O3}$ (PZT), $Pb_{1-x}La_xZr_{1-y}Ti_yO_3$ (PLZT), in which 0≤x≤1, and 0≤y<1, $PB(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, $ZrO_2$, $Y_2O_3$, SiC, lithium phosphate ($Li_3PO_4$), and $BaTiO_3$, and
the ion-conductive inorganic particles include at least one selected from a glassy active metal ion conductor, an amorphous active metal ion conductor, a ceramic active metal ion conductor, and a glass-ceramic active metal ion conductor or a combination thereof.

16. The lithium secondary battery as claimed in claim 14, wherein the ion-conductive inorganic particles include $Li_{1+x+y}Al_xTi_{2-x}Si_yP_{3-y}O_{12}$, in which $0<x<2$ and $0\leq y<3$, lithium titanium phosphate ($Li_xTi_y(PO_4)_3$, in which $0<x<2$, and $0<y<3$, lithium aluminum titanium phosphate ($Li_xAl_yTi_z(PO_4)_3$, in which $0<x<2$, $0<y<1$, and $0<z<3$, $Li_{1+x+y}(Al, Ga)_x(Ti, Ge)_{2-x}Si_yP_{3-y}O_{12}$, in which $0\leq x\leq 1$ and $0\leq y\leq 1$, lithium lanthanum titanate ($Li_xLa_yTiO_3$), in which $0<x<2$, and $0<y<3$, lithium germanium thiophosphate ($Li_xGe_yP_zS_w$), in which $0<x<4$, $0<y<1$, $0<z<1$, and $0<w<5$, lithium nitride ($Li_xN_y$), in which $0<x<4$, and $0<y<2$, $SiS_2(Li_xSi_yS_z)$ type glass, in which $0<x<3$, $0<y<2$, and $0<z<4$, $P_2S_5(Li_xP_yS_z)$ type glass, in which $0<x<3$, $0<y<3$, and $0<z<7$, $Li_2O$, LiF, LiOH, $Li_2CO_3$, $LiAlO_2$, $Li_2O-Al_2O_3-SiO_2-P_2O_5-TiO_2-GeO_2$-based ceramics, garnet-based ceramics ($Li_{3+x}La_3M_2O_{12}$), in which $0\leq x\leq 5$, and M=Te, Nb, or Zr), or a combination thereof.

* * * * *